Dec. 16, 1930.　　　A. PASCOO　　　1,785,646
BABY CARRIAGE
Filed July 9, 1928　　4 Sheets-Sheet 1
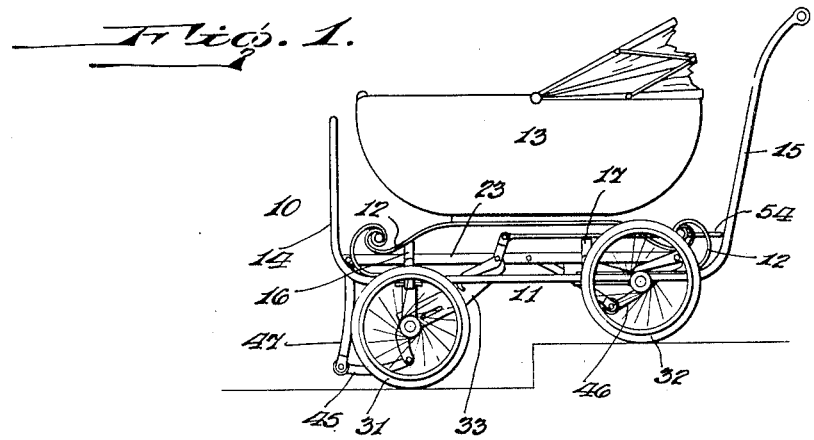
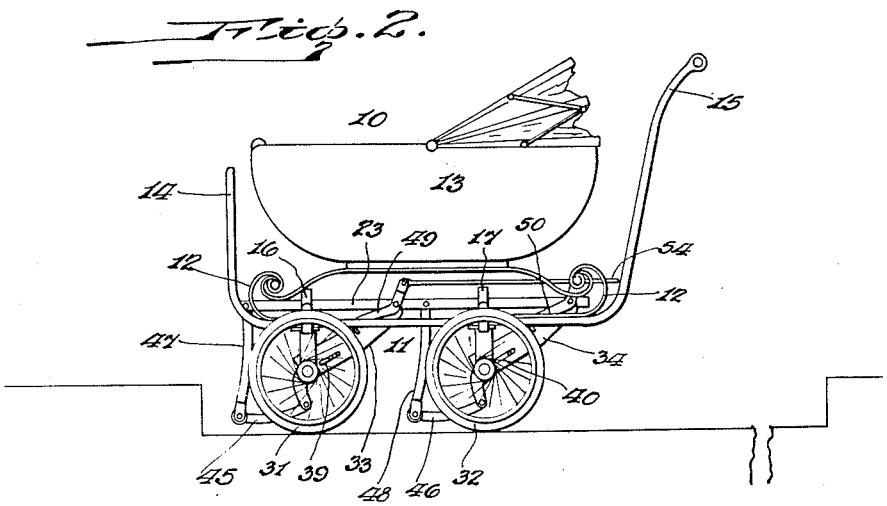
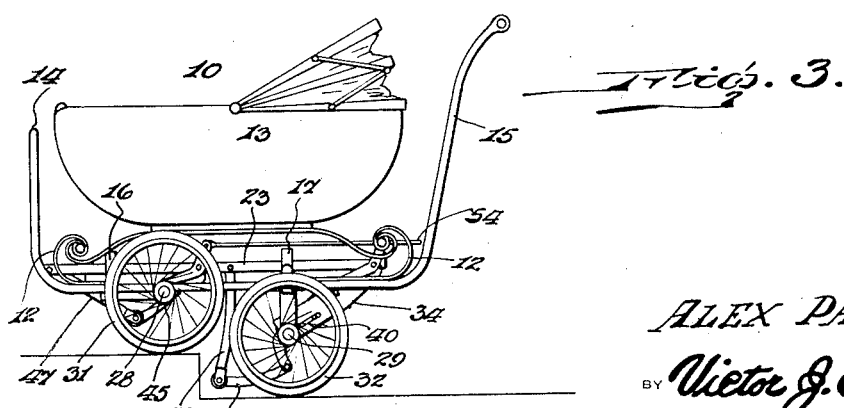
ALEX PASCOO.
INVENTOR Dec. 16, 1930.    A. PASCOO    1,785,646
BABY CARRIAGE
Filed July 9, 1928    4 Sheets-Sheet 2

ALEX PASCOO.
INVENTOR
BY Victor J. Evans
ATTORNEY

WITNESS:

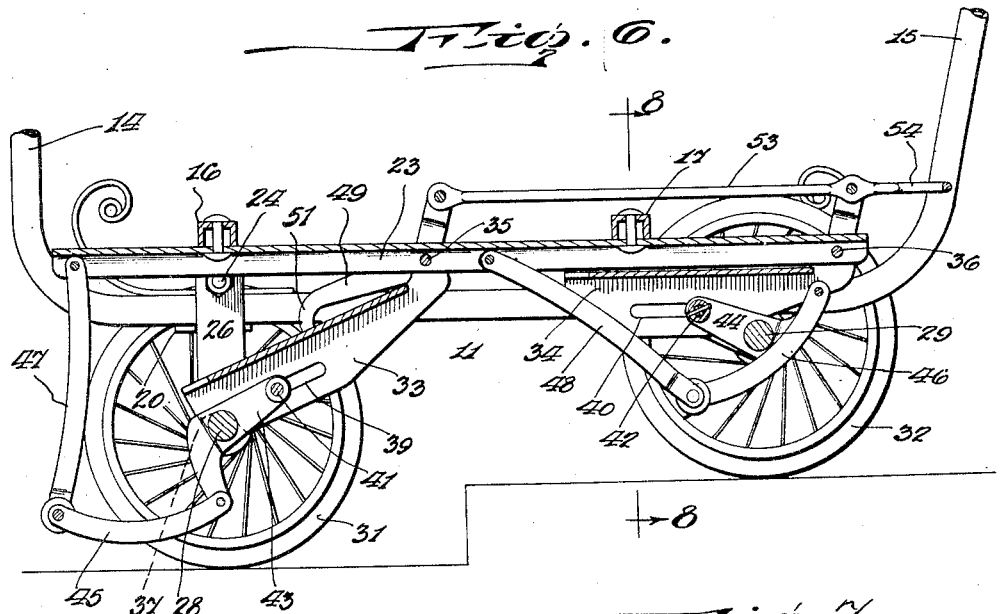
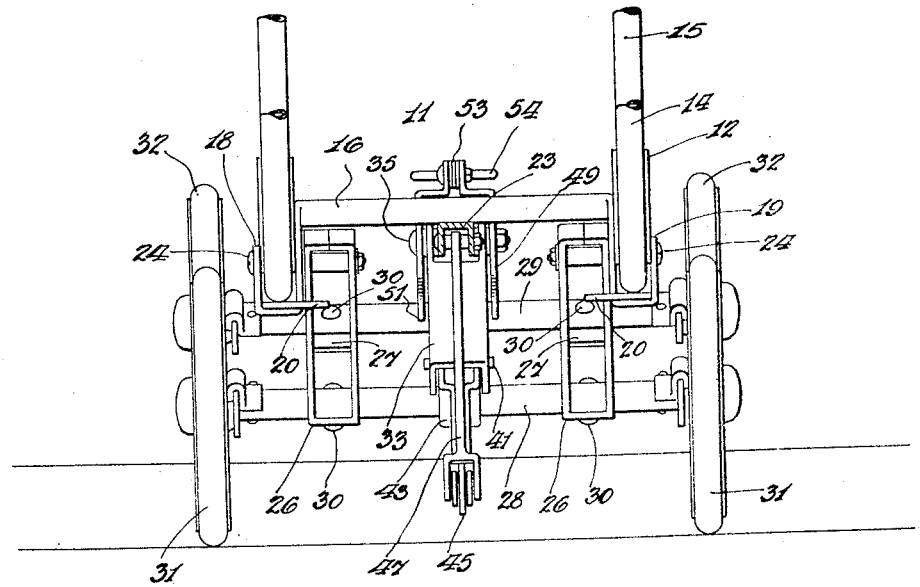

Dec. 16, 1930.   A. PASCOO   1,785,646
BABY CARRIAGE
Filed July 9, 1928   4 Sheets-Sheet 4

ALEX PASCOO, INVENTOR

Patented Dec. 16, 1930

1,785,646

UNITED STATES PATENT OFFICE

ALEX PASCOO, OF BRONX, NEW YORK

BABY CARRIAGE

Application filed July 9, 1928. Serial No. 291,315.

This invention relates to improvements in baby carriages and has for its primary object the provision of a chassis or undercarriage therefor, by which the body is maintained on a horizontal plane while being rolled from a high level to a lower level and vice versa.

Another object resides in a baby carriage which may be rolled down a curb from the side walk onto the street level and vice versa when rolling the same from one side of a street to the other, without requiring backward and forward tilting of the carriage which ofttimes annoys the occupant, besides taxing the strength of the person pushing the same.

A further object is to provide a chassis for baby carriages and like wheeled vehicles in which the front and rear wheels are mounted to swing and lock on two separate horizontal planes.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side elevation of my improved baby carriage showing the same being lowered from a sidewalk to a street level.

Figure 2 is a similar view but showing the baby carriage fully resting upon the street level.

Figure 3 is a similar view showing the carriage passing from the street level to the higher level of a sidewalk.

Figure 6 is a similar view on the line 6—6 of Figure 4 showing the position of the front wheels after rolling down over a street curb.

Figure 7 is a front end elevation of the chassis.

Figure 4:
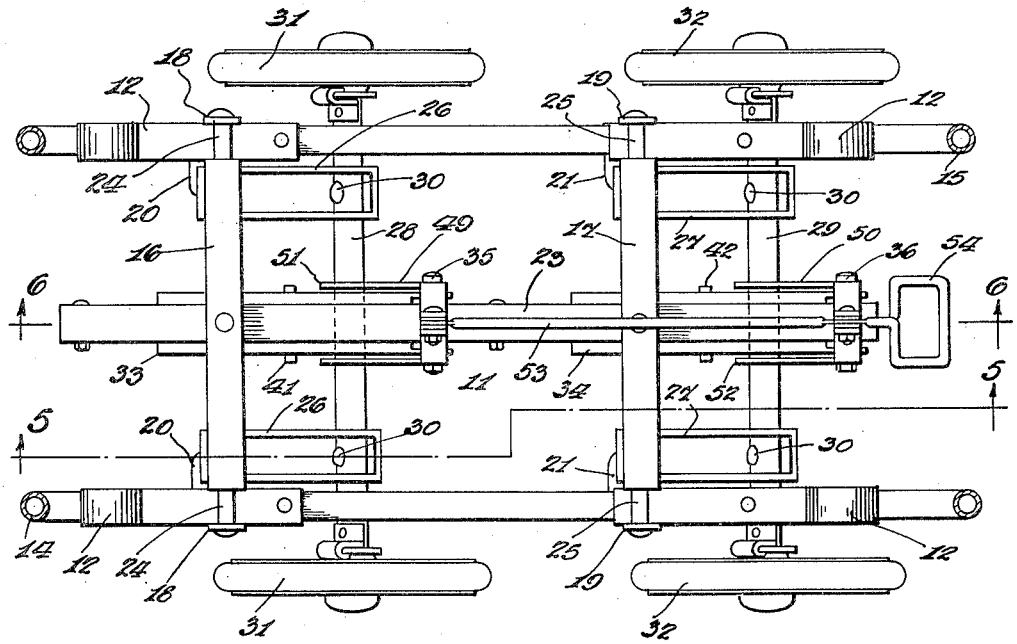
Figure 4 is a top plan view of the chassis with the wheels locked against swinging movement when rolling the same under normal conditions.

Referring to the drawings by reference characters, the numeral 10 designates my improved baby carriage or coach in its entirety which includes a chassis 11 having springs 12 on which the body 13 is yieldingly supported. Handles 14 and 15 are provided at the front and rear respectively by which the carriage may be manually pushed under normal conditions, but when rolling the carriage from one level to the other, the same should be pushed forward by grasping the handle 15 for a purpose to be more fully appreciated.

The chassis further includes transverse channel bars 16 and 17 having their free ends bent downwardly and upwardly to provide U-shaped attaching brackets 18 and 19 which embrace the side rails of the chassis frame. Interposed between the underside of the side rails of the chassis and the bight portion of the U-shaped brackets 18 and 19 are stop plates 20 and 21 respectively while bolts or rivets 22 pass therethrough for securely fastening the parts together. Bolted to the transverse bars centrally thereof and extending longitudinally of the chassis is a channel bar 23 which in practice constitutes a central strengthening bar of the chassis.

Bolts 24 and 25 are mounted in the adjacent legs of the brackets 18 and 19 and project inwardly thereof to pivotally support pair of hangers 26 and 27 respectively which constitute bearings for front and rear axles 28 and 29. The axles do not rotate as they are fixedly connected to the hangers by bolts 30, while the ends of the axles project beyond the sides of the chassis to rotatably support the front and rear wheels 31 and 32 respectively. Both sets of wheels are of the same diameter to support the body on a horizontal plane at all times. The hangers 26 and 27 strike the stop plates 20 and 21 when the wheels are in their lowered position to limit swinging movement of the same in one direction, while locking levers 33 and 34 engage the axles 28 and 29 to prevent swinging of the latter in an opposite direction. The levers 33 and 34 are pivoted to the longitudinal bar 23 as at 35 and 36 respectively and are of inverted U-shape in cross section with their side walls notched at the front ends as at 37 and 38 to firmly seat against the axles which they engage. The side walls of the respective locking levers are slotted as at 39 and 40 to slidably receive pins 41 and 42 to which one of the ends of bell crank levers 43 and 44 are pivotally connected. The bell cranks are pivoted to the respective axles intermediate their ends and have their other ends pivotally connected to curved links 45 and 46 which in turn are pivoted to the lower ends of bumper arms 47 and 48 pivoted to the longitudinal center bar 23. When the wheels are in lowered position, the bumper bars extend forward of the transverse plane of the tread portions of the wheels and depend to within a short distance of the supporting surface over which the wheels travel as clearly shown in Figure 2 of the drawings.

Figure 5:
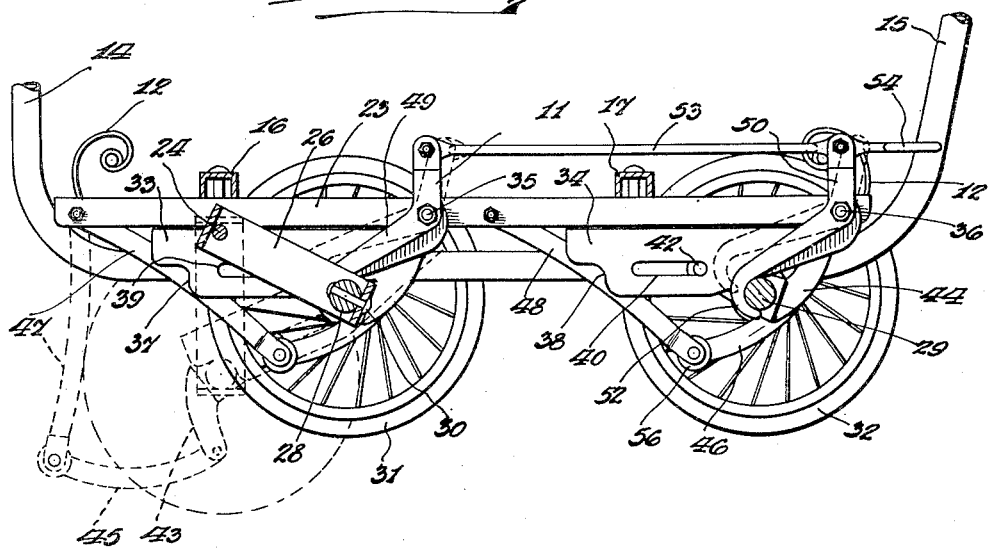
Figure 5 is a vertical longitudinal sectional view on the line 5—5 of Figure 4 but showing the lowered position of the forward wheels in dotted lines.
Figure 8:
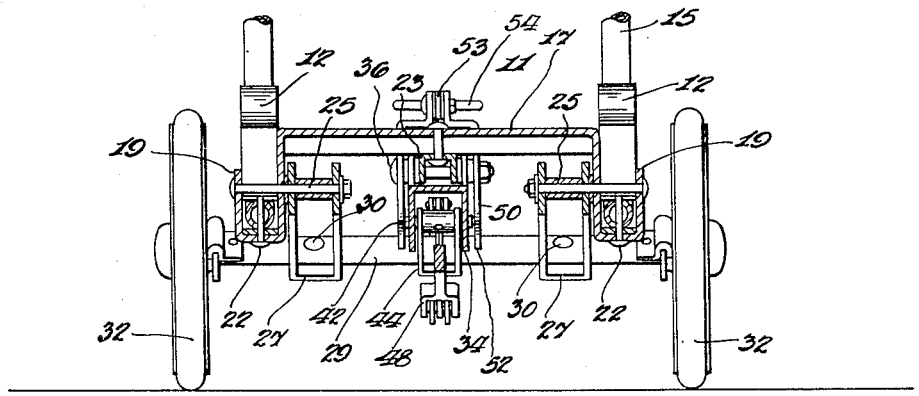
Figure 8 is a vertical transverse sectional view on the line 8—8 of Figure 6.
Figure 9:
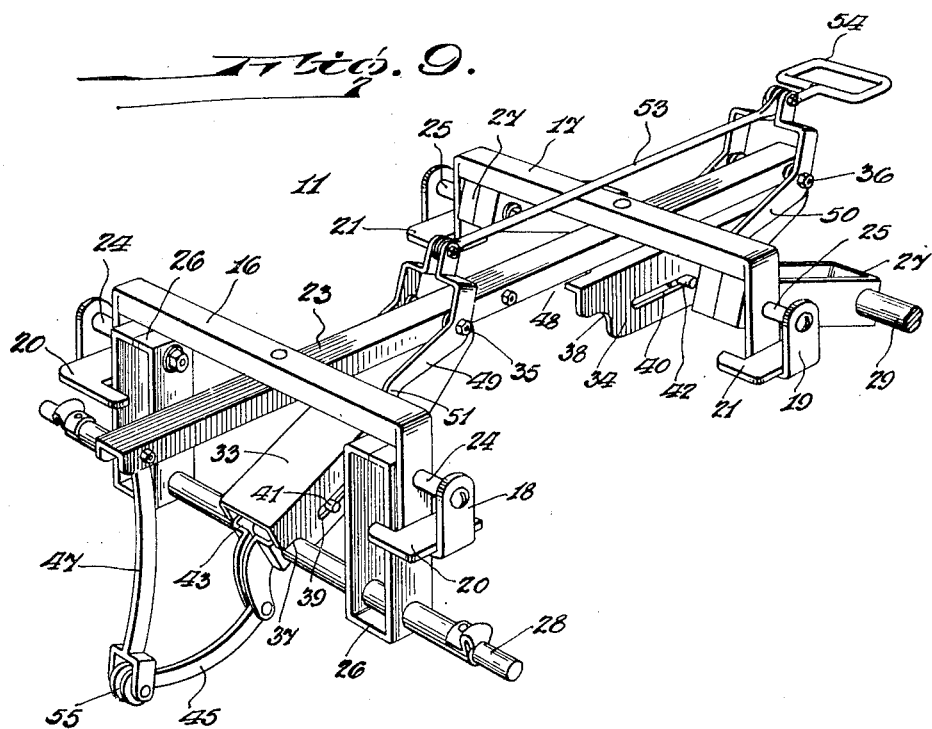
Figure 9 is a detail perspective view of the wheel actuating mechanism.

For locking the wheels in a raised position as shown in Figure 5 of the drawings, I provide locking levers 49 and 50 which are pivoted to the pivot bolts 35 and 36 on opposite sides of the levers 33 and 34. The lower free ends of the levers 49 and 50 terminate in hooks 51 and 52 for hooking engagement with the front and rear axles 28 and 29 respectively and by which the axles are held in a raised position against side bars of the chassis whereby the weight of the body and chassis under ordinary conditions is supported by the front and rear axles. The upper ends of the locking levers 49 and 50 are pivotally connected to an actuating rod 53 which overlies the longitudinal bar 23 and extends beyond the rear end of the bar to dispose the handle 54 on the end thereof within easy reach of an operator. By the actuation of the rod 53, an operator may control the action of the locking levers 49 and 50.

In practice, assume that the carriage is being pushed over a level surface at which time the rod 53 is disposed in pushed in position with the sets of wheels raised and locked by the levers 49 and 50 as shown in Figure 5 of the drawing. Upon reaching a street crossing, the rod 53 is manually pulled out which swings the hooked ends 51 and 52 of the locking levers free of their engagement with the front and rear axles. The operator pushes the carriage horizontally without tilting the same and as the front set of wheels 31 clear the edge of the curb, the weight of the same swings them to a lowered position which causes the release of the locking lever 33 which was formerly supported by the axle. The notched portions 37 of the lever seats against the axle and co-acts with the stop plates 20 to lock the wheels in lowered position, the wheels having dropped to the lower level of the street as clearly shown in Figure 1 of the drawings. The bumper arm 47 extends forward of the plane of the front wheels and the lower end carries a roller 55 for a purpose to be hereinafter explained. Upon further rolling of the carriage, the set of rear wheels 32 clear the curb at which time the operator supports the rear end of the carriage until the rear wheels have swung to their lowered position where they are locked by the lever 34 similar to the locking of the front wheels just explained. The rear wheels having swung to the level of the front wheels, now rest upon the street level as shown in Figure 2 of the drawings, wherein the bumper arm 48 is disposed on a plane forward of the wheels and which carries a roller 56 on the lower end thereof. The carriage may now be pushed to the opposite curb whereupon the roller 55 of the front bumper arm strikes the curb, which pushes the arm rearwardly which causes the link 45 to swing the bell crank 43 which in turn lifts the locking lever 33 away from engagement with the axle, and continued force against the roller and the weight of the chassis and body causes the wheels to swing back to their raised position during which time they have rolled over the curb to the high level as shown in Figure 3 of the drawing. After the front wheels have passed onto the higher level, the roller 56 of the rear bumper arm strikes the curb and the same action takes place for releasing the locking lever 34 to permit the rear wheels to swing backward to a raised position, it being appreciated that the operator supports the rear end of the carriage during the travel of the rear wheels to their raised position. As the carriage reaches the higher level, the operator grasps the handle 54 and pushes the actuating rod 53 in a forward direction to cause the levers 49 and 50 to lock with the respective front and rear axles. The wheel structure is now locked to the chassis for propelling the carriage over a level unobstructed surface.

It might be well to mention that the front and rear wheels drop by gravity when passing from a high level to a lower level, although springs may be provided if desired to increase the speed of downward swinging of the same.

Although I have shown my invention as applied to the chassis of a baby carriage, it may also be adapted for use on other vehicles such as invalid's roll chairs and the like, without in any way departing from the spirit of the same.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a wheel vehicle, front and rear sets of swingingly mounted wheels for swinging movement to two different horizontal planes, manually operated means for locking either or both of said sets of wheels at the limit of their swinging movement to the higher plane, and automatic means for locking said sets of wheels upon actuation of said manually operated means to unlocked position.

2. A baby carriage including a chassis, front and rear sets of wheels mounted for swinging movement beneath said chassis, manually operated means for locking said sets of wheels at the limit of their upward swinging movement and for releasing the same to freely swing to a lowered position, and individual automatic locking means operable upon release of sets of wheels by said manually operated means to lock either or both of the same in a lowered position upon dropping of either or both of said sets of wheels thereto.

3. A baby carriage including a chassis, sets of wheels mounted for swinging movement beneath said chassis, manually operated means for locking said sets of wheels at the limit of their upward swinging movement and for releasing the same to freely swing to a lowered position, and individual automatic locking means operable upon release of sets of wheels by said manually operated means to lock the same in a lowered position upon dropping of said sets of wheels thereto, and means engageable with an obstruction in the path of travel of the vehicle for successively releasing said individual automatic locking means to allow said sets of wheels to be forced back by engagement with the obstruction for return to a raised position.

4. A baby carriage comprising a chassis, a body mounted on said chassis, front and rear sets of wheels, and rigid means movable on said chassis and carrying said sets of wheels by which the horizontal planes of the sets of wheels may be varied to cause the same to maintain said body on a horizontal plane when passing from a high level to a stepped lower level, and vice-versa.

5. In a baby carriage having a chassis frame, hangers pivotally mounted in said chassis frame, axles supported by said hangers, wheels rotatably mounted on the outer ends of said axles, manually controlled means engaging said axles to hold the same against said chassis frame and releasable for allowing said sets of wheels to swing to a lower horizontal plane, individual automatic locking means engageable with the respective axles to lock said wheels in a lowered position, and bumper means extendable beyond the plane of the front portions of said wheels when lowered to be actuated by an obstruction in the path of said wheels to respectively release said individual automatic locking means to allow said wheels to return to a raised position.

6. In a baby carriage having a chassis frame, hangers pivotally mounted in said chassis frame, axles supported by said hangers, wheels rotatably mounted on the outer ends of said axles, manually controlled means engaging said axles to hold the same against said chassis frame and releasable for allowing said sets of wheels to swing to a lower horizontal plane, said manually controlled means embodying pivoted hook levers and an actuating rod operatively connecting said levers, individual automatic locking means engageable with the respective axles to lock said wheels in a lowered position, and bumper means extendable beyond the plane of the front portions of said wheels when lowered to be actuated by an obstruction in the path of said wheels to respectively release said individual automatic locking means to allow said wheels to return to a raised position.

7. In a baby carriage having a chassis frame, hangers pivotally mounted in said chassis frame, axles supported by said hangers, wheels rotatably mounted on the outer ends of said axles, manually controlled means engaging said axles to hold the same against said chassis frame and releasable for allowing said sets of wheels to swing to a lower horizontal plane, individual automatic locking means engageable with the respective axles to lock said wheels in a lowered position, said individual automatic locking means including pivoted locking levers having notches therein for seating engagement with the respective axles, and bumper means extendible beyond the plane of the front portions of said wheels when lowered to be actuated by an obstruction in the path of said wheels to respectively release said individual automatic locking means to allow said wheels to return to a raised position.

8. In a baby carriage having a chassis frame, hangers pivotally mounted in said chassis frame, axles supported by said hangers, wheels rotatably mounted on the outer ends of said axles, manually controlled means engaging said axles to hold the same against said chassis frame and releasable for allowing said sets of wheels to swing to a lower horizontal plane, individual automatic locking means engageable with the respective axles, to lock said wheels in a lowered position, said individual automatic locking means including pivoted locking levers having notches therein for seating engagement with the respective axles, and bumper means extendible beyond the plane of the front portions of said wheels when lowered to be actuated by an obstruction in the path of said wheels to respectively release said individual automatic locking means to allow said wheels to return to a raised position, said bumper means consisting of bell cranks turnably mounted on said axles, one end of said bell cranks being connected with the respective locking levers by pin and slot connections, bumper arms pivoted to said chassis, and links connecting the respective pumper arms with the respective bell cranks.

9. A vehicle comprising a body adapted for horizontal travel over low and high planes, there being an upward step between said planes, a chassis including transversely disposed members, pivot means carried by said members, front and rear axes having wheels thereon and swingable from a low to a high plane, hangers pivoted on said means and carrying said axes thereon, said axes adapted for swinging movement from the low to the high plane as the respective front and rear parts of said body travel horizontally over said step.

10. In a vehicle comprising a chassis having a longitudinally disposed central member, transverse members carried thereon, a body supported on said members and adapted for horizontal travel over low and high planes, there being an upward step between said planes, front and rear axes having wheels thereon and swingable from said low to said high plane, hangers pivoted on said transverse members and carrying said axes, arms pivoted on said first member and depending in front of each axis below the level of said high plane, and connecting means disposed between the base of each arm and each axis, each of said arms adapted to strike said step as the respective front and rear parts of said body pass horizontally over said step to swing said wheels from the low to the high plane.

In testimony whereof I have affixed my signature.

ALEX PASCOO.